Oct. 19, 1926.
A. H. BECKER
1,603,575
TROLLEY HARP
Filed June 13, 1924
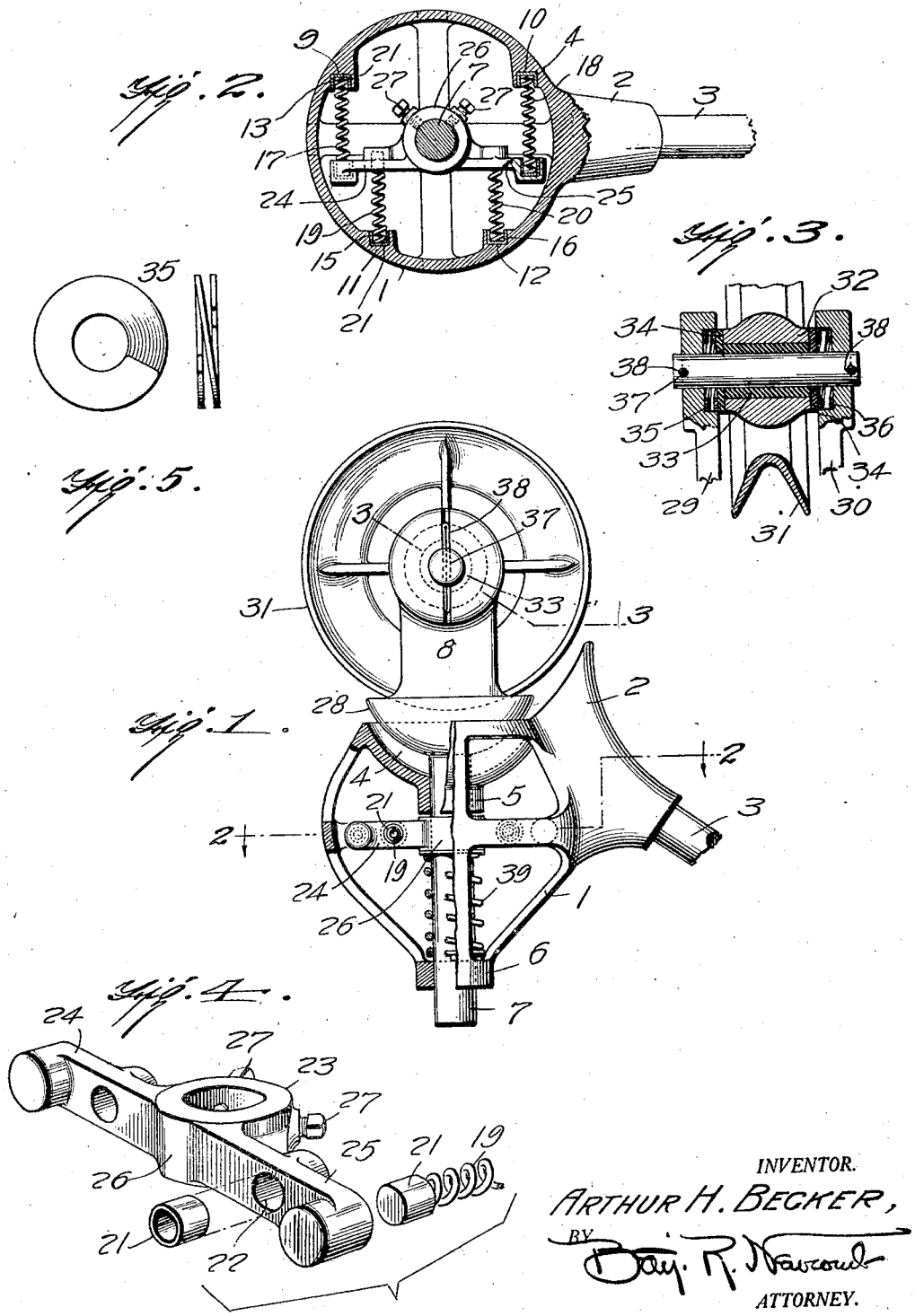
INVENTOR.
ARTHUR H. BECKER,
BY
ATTORNEY.

Patented Oct. 19, 1926.

1,603,575

UNITED STATES PATENT OFFICE.

ARTHUR H. BECKER, OF BALTIMORE, MARYLAND.

TROLLEY HARP.

Application filed June 13, 1924. Serial No. 719,701.

This invention relates to a trolley harp of the type adapted for use with overhead wires in electric railway systems.

It is well known that the wear to which trolley harps are subjected in service necessitates their frequent renewal at enormous expense, therefore, one of the objects of the present invention is to provide a trolley harp of such construction that wear is reduced to a minimum.

Another object resides in so constructing the trolley harp that the cost of manufacture is relatively small as compared with the types now in use and further, the arrangement of the parts and their relation to each other is such that the components may be repaired or replaced at small expense.

A still further obect consists in providing a trolley harp in which the conducting wheel is so journalled that side thrust is resiliently compensated for; and also, a univeral movement of the trolley wheel carrying member is made possible by the introduction of a resilient mounting of particularly novel construction and which permits the trolley wheel carrier to oscillate laterally as well as reciprocate vertically and yet it is always stressed by resilient means in such a manner that it returns to its normal position when no thrust is operating on the same.

With the above and other objects in view, I will now describe a specific embodiment of my invention which I have shown in the accompanying drawing merely for the purpose of illustrating the principle thereof, and in which:

Figure 1 is a side elevation, partly in section, of the device.

Fig. 2 is a sectional view on the line 2—2 of Figure 1.

Fig. 3 is a fragmentary sectional view showing the mounting of the conducting wheel.

Figure 4 is a perspective view of the trolley wheel carrier yoke, and

Fig. 5 is a detail view of the resilient washer for the trolley wheel.

In detail:

The invention, as herein shown, comprises a body 1 of hollow formation properly webbed to strengthen the same and to which is attached an extension 2 carrying the spindle 3 which fits into the socket on the end of the trolley pole not herein shown.

On the upper side of the body 1 is a hemispherical socket 4 terminating in a boss 5 which aligns with a similar boss 6 at the lower end of the body 1, both bosses being bored out to receive the shank 7 of the trolley wheel carrier 8 to be more particularly described hereinafter.

Within the body 1 and located on opposite sides of the same are pockets 9, 10, 11 and 12 which receive cups 13, 14, 15 and 16 retaining the ends of springs 17, 18, 19 and 20, respectively, said springs being received in similar cups and sockets 21 and 22 of a yoke 23 having arms 24 and 25 at diametrically opposite locations with respect to a hub 26, said hub being provided with set screws 27 whereby it may be secured to the spindle or shank 7 at any suitable location.

The trolley wheel carrier 8, in addition to the spindle or shank 7, is provided at its upper end with a hemispherical portion 28 adapted to seat in the depression 4 of the body 1 when the trolley wheel carrier reaches its lowermost point; and the upper end of the trolley wheel carrier is bifurcated to form the ears 29 and 30 between which is received the conducting wheel 31 having a hub 32 which resceives a bushing 33 bounded on each side by washers 34. In recesses at adjacent sides of the ears 29 and 30 are convolute spring washers 35 and 36 which absorb side thrust of the conducting wheel in either direction, this resilient feature being important in eliminating wear; a journal pin 37 extends through the conducting wheel and its attendant washers and is secured in place by cotter pins 38.

In assembling the device above described the yoke 23 is adjusted in such a manner that the spherical portion 28 is raised above its socket 4 and a spring 39 maintains the same under usual conditions above the seat 4.

The operation is as follows:

Suppose the extension 3 has been suitably inserted in the socket of a trolley pole and the trolley wheel 31 bears against the wire. As the car travels along the side thrust on the trolley wheel 31 will be absorbed by the washers 35 and 36, while the vertical thrust will be absorbed by the spring 39 and springs 17, 18, 19 and 20 which also oppose lateral oscillation of the trolley wheel, serving to return said trolley wheel to its normal position immediately upon any strains being relieved.

It will be seen from the foregoing that the construction and arrangement of the parts of the trolley harp are such that practically every strain to which the same can be subjected in ordinary use has been compensated for by providing a universal motion which is resiliently sustained in every movement and while I have herein described a specific embodiment of the invention, it is nevertheless to be understood that in carrying the invention into practice I may resort to any and all modifications falling within the scope of the appended claims.

I claim:

1. In a trolley harp, a contact wheel journalled in a carrying member for transverse displacement, said carrying member being mounted in a supporting body for lateral rotative and independent vertical movement.

2. In a trolley harp, a contact wheel journalled in a carrying member for transverse displacement, means resiliently opposing such transverse displacement, and said carrying means being mounted in a supporting body for lateral rotative and independent vertical movement.

3. In a trolley harp, a contact wheel journalled in a carrying member for transverse displacement, said carrying member being mounted in a supporting body for lateral rotative and independent vertical movement, and means for resiliently resisting such movements.

4. In a trolley harp, a contact wheel journalled in a carrying member for transverse displacement, means resiliently opposing such transverse displacement, said carrying member being mounted in a supporting body for lateral rotative and independent vertical movement, and means for resiliently resisting such movements.

5. In a trolley harp, a contact wheel journalled in a carrying member for transverse displacement, means resiliently opposing such displacement, said carrying member having an extension journalled in a supporting body permitting lateral rotative and vertical movement, and resilient means resisting such movements and including a yoke on said extension bearing against springs carried within said supporting body.

6. In a trolley harp, a contact wheel journalled in a carrying member for transverse displacement, means resiliently opposing such displacement, said carrying member having an extension journalled in a supporting body permitting lateral rotative and vertical movement, resilient means resisting such movements and including a yoke on said extension bearing against springs carried within said supporting body, and means elevating the carrying member with respect to the body.

7. In a trolley harp, a contact wheel journalled in a carrying member for transverse displacement, means resiliently opposing such displacement, said carrying member having an extension journalled in a supporting body permitting lateral rotative and vertical movement, resilient means resisting such movements and including a yoke on said extension bearing against springs carried within said supporting body, and resilient means elevating the carrying member with respect to the body.

8. In a trolley harp, a contact wheel journalled in a carrying member for transverse displacement, means resiliently opposing such displacement, said carrying member having an extension journalled in a supporting body permitting lateral rotative and vertical movement, resilient means resisting such movements and including a yoke on said extension bearing against springs carried within said supporting body, and a spring between the body and yoke for elevating the carrying member with respect to the body.

9. In a trolley harp, a contact wheel journaled in a carrying member and adapted for transverse displacement, means tending to center said wheel and resiliently opposing such displacement, said carrying member having an extension journaled in a supporting body for permitting rotative and vertical movements, and means resisting such movements comprising opposed springs carried within the supporting body and acting to retain the carrying member in normal position.

10. In a trolley harp, a contact wheel journaled in a carrying member and arranged for lateral displacement with respect thereto, means resiliently opposing such displacement and tending to retain said wheel in normal position, said carrying member having an extension journaled in a supporting body for allowing pivotal and vertical movements thereof, means resisting such movements and including a yoke on said extension, and springs bearing against said yoke and carried within said supporting member, one of said springs normally elevating said carrying member with respect to the body.

In testimony whereof I have hereunto affixed my signature this 2nd day of March, 1923.

ARTHUR H. BECKER.